(12) United States Patent
Yang et al.

(10) Patent No.: US 9,958,298 B2
(45) Date of Patent: May 1, 2018

(54) ELECTRONIC DEVICE WITH WATERPROOF STRUCTURE

(71) Applicant: PIXART IMAGING INC., Hsin-Chu (TW)

(72) Inventors: Jr-Shen Yang, Hsin-Chu (TW); Ching-Lin Chung, Hsin-Chu (TW); Yen-Min Chang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 8 days.

(21) Appl. No.: 15/178,098

(22) Filed: Jun. 9, 2016

(65) Prior Publication Data

US 2017/0254699 A1     Sep. 7, 2017

(30) Foreign Application Priority Data

Mar. 7, 2016   (TW) .............................. 105106882 A

(51) Int. Cl.
  *G01D 5/28*   (2006.01)
  *G01D 5/34*   (2006.01)
  *G04F 3/08*   (2006.01)

(52) U.S. Cl.
  CPC ................ *G01D 5/28* (2013.01); *G01D 5/34* (2013.01); *G04F 3/08* (2013.01)

(58) Field of Classification Search
  CPC ......... G01J 1/429; H05K 5/0086; G01D 5/28; G01D 5/34; G04F 3/08; A61B 5/681; A61B 5/02438; G01N 33/483; G01F 1/163; G01F 1/1643
  See application file for complete search history.

(56) References Cited

U.S. PATENT DOCUMENTS

| | | | | |
|---|---|---|---|---|
| 4,733,383 A | * | 3/1988 | Waterbury | ............. G04G 21/02 368/10 |
| 2006/0237648 A1 | * | 10/2006 | Bushberg | .................. G01T 7/00 250/336.1 |

* cited by examiner

*Primary Examiner* — David Porta
*Assistant Examiner* — Faye Boosalis
(74) *Attorney, Agent, or Firm* — Li&Cai Intellectual Property (USA) Office

(57) ABSTRACT

An electronic device with waterproof structure includes an assembly and a manipulation member movably disposed on an outer surface of the assembly. The assembly includes a case and an optical detection module. The case defines a waterproof space and has a translucent region. The optical detection module is arranged in the waterproof space. The optical detection module has a lighting unit and a sensor array. Light emitted from the lighting unit enables to travel out of the waterproof space by penetrating through the translucent region. At least part of the manipulation member is corresponding in position to the translucent region. The lighting unit is configured to emit light onto the manipulation member, and the sensor array is configured to receive the light reflected from the manipulation member.

20 Claims, 8 Drawing Sheets

ELECTRONIC DEVICE WITH WATERPROOF STRUCTURE

BACKGROUND OF THE INVENTION

1. Field of the Invention

The instant invention relates to a waterproof device; in particular, to an electronic device with waterproof structure.

2. Description of Related Art

The conventional electronic device (e.g., wearable device) includes a mechanical detection switch and a controlling component (e.g., knob or button) for triggering the mechanical detection switch. The conventional electronic device is provided with a waterproofed space by arranging a gasket or a rubber ring outside the mechanical detection switch and the controlling component, thereby making it waterproof. In other words, the mechanical detection switch and the controlling component must be arranged in the waterproof space.

However, when the controlling component is used after a period of time, a portion of the gasket (or the rubber ring) abutted against the controlling component easily generates a deformation problem, so water may flow into the waterproof space by passing through the deformed gasket.

SUMMARY OF THE INVENTION

The instant disclosure provides an electronic device with waterproof structure for effectively improving the problem generated from the conventional electronic device.

The instant disclosure provides an electronic device with a waterproof structure, comprising: an assembly, comprising: a case having a translucent region, wherein an enclosed waterproof space is defined by the case; and an optical detection module arranged in the waterproof space, wherein the optical detection module has a lighting unit and a sensor array arranged close to the lighting unit, the translucent region is located in a lighting path of the lighting unit, and the lighting unit is configured to emit light to penetrate out of the waterproof space via the translucent region; and a manipulation member movably disposed on an outer surface of the case and arranged outside the waterproof space, wherein at least part of the manipulation member is corresponding in position to the translucent region and has a symbol portion, and the manipulation member is movable with respect to the translucent region between an initial position and an adjusting position; wherein the lighting unit is configured to selectively emit light to arrive on the manipulation member by passing through the translucent region, and the manipulation member is configured to reflect light to arrive on the sensor array by passing through the translucent region; at least two different receivers of the sensor array are configured to receive light reflected from the symbol portion of the manipulation member when the manipulation member is arranged at the initial position and the adjusting position.

The instant disclosure also provides an electronic device with a waterproof structure, comprising: an assembly, comprising: a case having a translucent region, wherein a waterproof space is defined by the case; and an optical detection module arranged in the waterproof space, wherein the optical detection module has a lighting unit and a sensor array, the lighting unit is configured to emit light to penetrate out of the waterproof space via the translucent region; and a manipulation member movably disposed on an outer surface of the case, wherein at least part of the manipulation member is corresponding in position to the translucent region, the lighting unit is configured to selectively emit light to arrive on the manipulation member by passing through the translucent region, and the manipulation member is configured to reflect light to arrive on the sensor array by passing through the translucent region.

In summary, the electronic device of the instant disclosure is provided with a waterproof function by adapting the optical detection module in the waterproof space and arranging the manipulation member outside the waterproofing space, and the electronic device has a better resolution using the optical detection module.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

First Embodiment

Please refer to FIGS. 1 through 4B, which show a first embodiment of the instant disclosure. References are hereunder made to the detailed descriptions and appended drawings in connection with the instant invention. However, the appended drawings are merely shown for exemplary purposes, rather than being used to restrict the scope of the instant invention.

Figure 1:
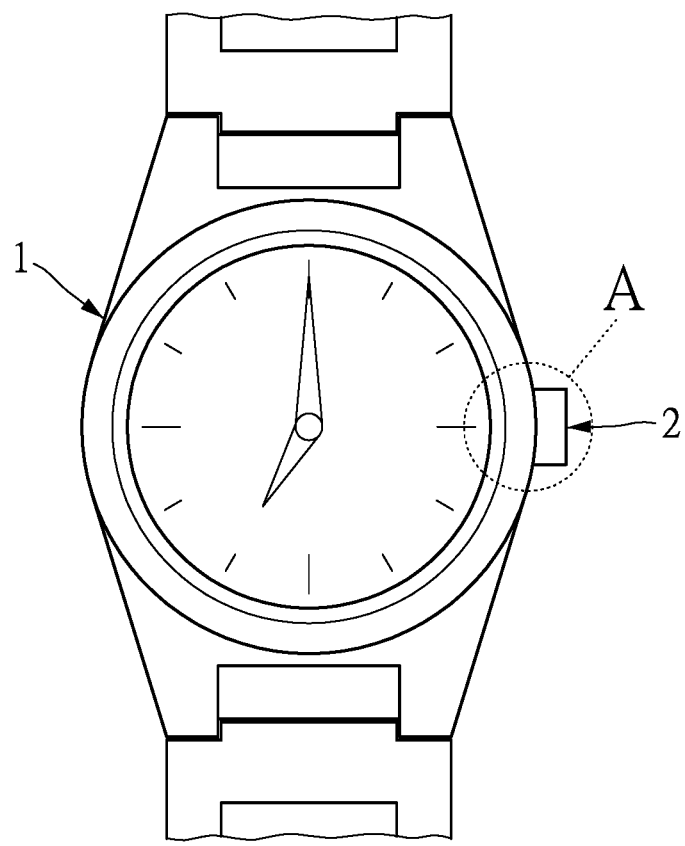
FIG. 1 is a perspective view showing an electronic device with a waterproof structure according to the instant disclosure.
Figure 2A:
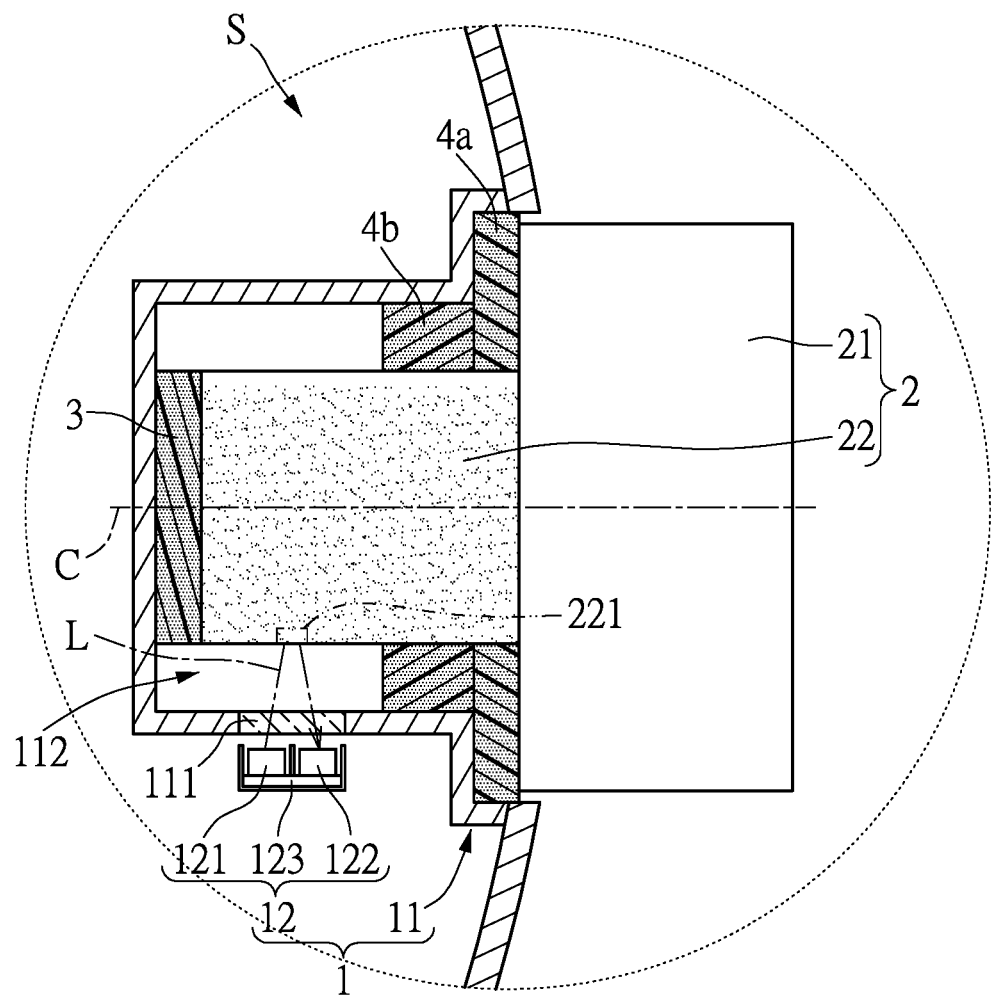
FIG. 2A is a cross-sectional view of the A portion of FIG. 1.

Please refer to FIGS. 1 and 2A, which show an electronic device 100 (e.g., watch, glasses, earphone, and so on) with a waterproof structure, but the electronic device 100 is not limited to the instant embodiment. In other words, the electronic device 100 in the instant disclosure may be a non-wearable device (not shown, such as cellphone or mouse). In order to clearly disclose the instant disclosure, the electronic device 100 in the instant embodiment takes a wearable device 100 (i.e., watch) for an example.

The wearable device 100 includes an assembly 1, at least one manipulation member 2 (i.e., rod, knob, or button)

movably installed on the assembly 1, an elastic component 3, and at least one gasket 4a, 4b. The elastic component 3 and the at least one gasket 4a, 4b are arranged between the assembly 1 and the at least one manipulation member 2. The number of the at least one manipulation member 2 in the instant embodiment is one, and the number of the at least one gasket 4a, 4b in the instant embodiment is two, but the instant disclosure is not limited thereto.

The assembly 1 includes a case 11 and an optical detection module 12 arranged in the case 11. The case 11 in the instant embodiment is formed by assembling a plurality of compartments and defines an enclosed waterproof space S. The case 11 has a translucent region 111. An accommodating trough 112 is recessed on an outer surface of the case 11, and the translucent region 111 is arranged on a side wall of the accommodating trough 112. That is to say, light can enter into or leave out of the accommodating trough 112 by passing through the translucent region 111.

The size of the translucent region 111 can be changed according to the designer's demand. For example, when the translucent region 111 is provided in a minimum size (as shown in FIG. 2A), the portion of the case 11 facing the optical detection module 12 is translucent which is defined as the translucent region 111. When the translucent region 111 is provided with a maximum size (not shown), the case 11 is translucent. Moreover, the case 11 is preferably made of a transparent material (e.g., PMMA, PC, or glass and so on) for easily providing different sizes of the translucent region 111.

The optical detection module 12 is arranged in the waterproof space S and faces the translucent region 111 of the case 11. The optical detection module 12 includes a lighting unit 121, a sensor array 122 arranged close to the lighting unit 121, and a calculating unit 123 electrically connected to the sensor array 122. The sensor array 122 and the calculating unit 123 can be co-defined as an optical navigation chip (not labeled). Moreover, the optical detection module 12 (i.e., the lighting unit 121, the sensor array 122, and the calculating unit 123) in the instant embodiment is a package structure, but is not limited thereto.

The lighting unit 121 is preferably a UV LED chip 121. The translucent region 111 is located in a lighting path of the lighting unit 121, so the lighting unit 121 is configured to emit light L from the waterproof space S to the accommodating trough 112 of the case 22 via the translucent region 111. Moreover, light L can be reflected or refracted from the accommodating trough 112 to the waterproof space S via the translucent region 111.

The sensor array 122 includes a plurality of receivers 1221 in a matrix arrangement for receiving light L, which enters into the waterproof space S by passing through the translucent region 111. A wall (not labeled) is preferably disposed between the sensor array 122 and the lighting unit 121 for shielding a lateral light. That is to say, the sensor array 122 can avoid receiving light directly emitted from the lighting unit 121. The receivers 1221 of the sensor array 122 are respectively configured to receive light L from different angles, and the calculating unit 122 is used to have an estimation according to an information of the sensor array 122 corresponding to the received light L.

The manipulation member 2 is movably disposed on the outer surface of the case 11 and is arranged outside the waterproof space S. That is to say, the manipulation member 2 does not structurally and/or electrically connect to any element arranged in the case 11 (i.e., the optical detection module 12), thus the manipulation member 2 and the optical detection module 12 can be operated when the wearable device 100 is entirely submerged in water.

The manipulation member 2 is inserted into the accommodating trough 112, and at least part of the manipulation member 2 is corresponding in position to the translucent region 111. The wearable device 100 does not comprise any light guiding member (e.g., optical lens) arranged between the optical detection module 12 and the manipulation member 2, such that the lighting unit 121 is configured to emit light L to directly pass through the translucent region 111. Thus, the lighting unit 121 is configured to selectively emit light L to arrive on the manipulation member 2 by passing through the translucent region 111, and the manipulation member 2 is configured to reflect the light L to arrive on at least one of the receivers 1221 of the sensor array 122 by passing through the translucent region 111.

Figure 2B:
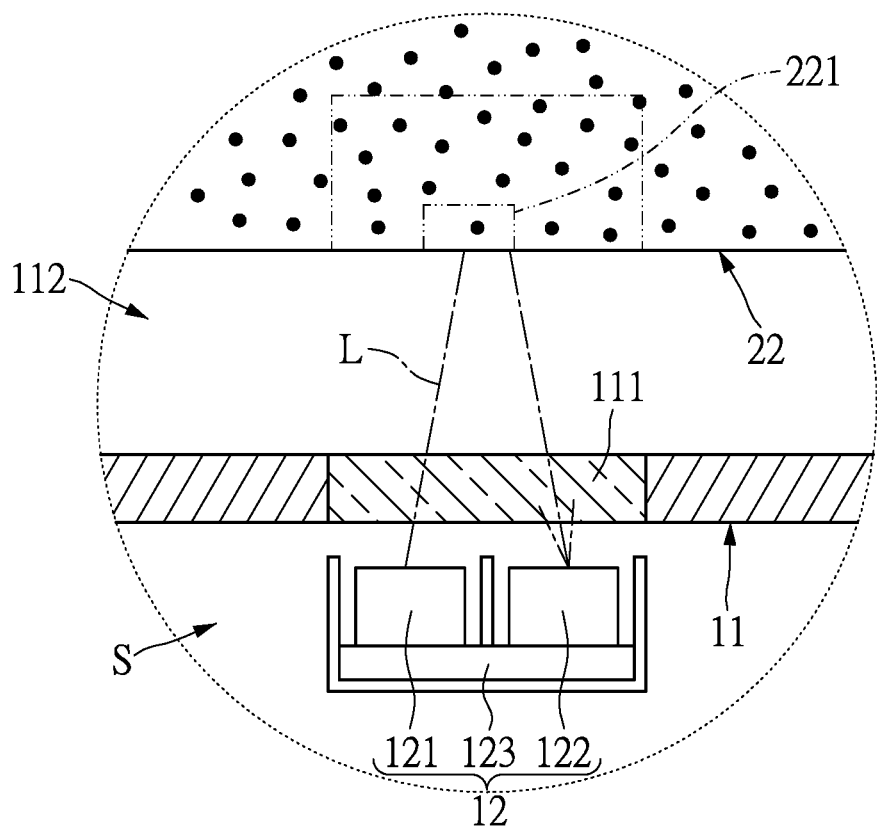
FIG. 2B is an enlarged view of FIG. 2A.

Specifically, the at least part of the manipulation member 2 (i.e., a portion of the manipulation member 2 surrounded by an outer dot-chain line shown in FIG. 2B) corresponding in position to the translucent region 111 has a symbol portion 221 (i.e., a portion of the manipulation member 2 surrounded by an inner dot-chain line shown in FIG. 2B). The manipulation member 2 is movable with respect to the translucent region 111 between an initial position (as shown in FIG. 2B) and an adjusting position (as shown in FIG. 3A or FIG. 4A).

The possible movement of the manipulation member 2 is disclosed as follows. The manipulation member 2 is substantially symmetrical to a central axis C, and the manipulation member 2 is configured to move into the central axis C and/or to rotate around the central axis C when the manipulation member 2 is adjusted between the initial position and the adjusting position. In other words, FIG. 3A shows the manipulation member 2 at the adjusting position after the manipulation member 2 has moved into the central axis C, and FIG. 4A shows the manipulation member 2 at the adjusting position after the manipulation member 2 has rotated around the central axis C.

Figure 2C:
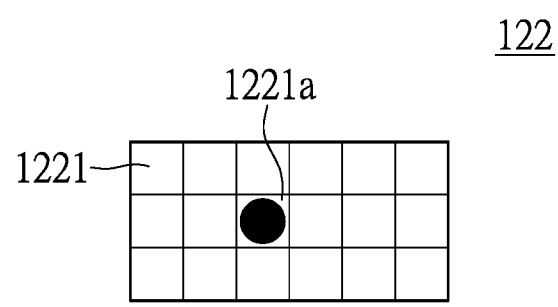
FIG. 2C is a top view showing the sensor array of FIG. 2B.

Accordingly, the lighting unit 121 is configured to selectively emit light L to arrive on the manipulation member 2 by passing through the translucent region 111, and the manipulation member 2 reflects the light L to arrive on the sensor array 122 by passing through the translucent region 111. At least two different receivers 1221 of the sensor array 122 (as shown in FIGS. 2C, 3B, 4B) are configured to receive light L reflected from the symbol portion 221 of the manipulation member 2 when the manipulation member 2 is arranged at the initial position and the adjusting position. Specifically, light L emitted from the lighting unit 121 arrives on an area of the manipulation member 2 (i.e., a portion of the manipulation member 2 surrounded by an outer dot-chain line shown in FIG. 2B, 3A, or 4A), and the area reflects the light L to all of the receivers 1221 of the sensor array 122. The relative position of the area and the translucent region 111 is fixed, and light L can be reflected from the symbol portion 221 at different positions onto different receivers 1221 when the symbol portion 221 moves in the area. Moreover, the calculating unit 123 is configured to estimate a moving trace of the manipulation member 2 according to an information of each receiver 1221 of the sensor array 122 corresponding to the received light.

Figure 3A:
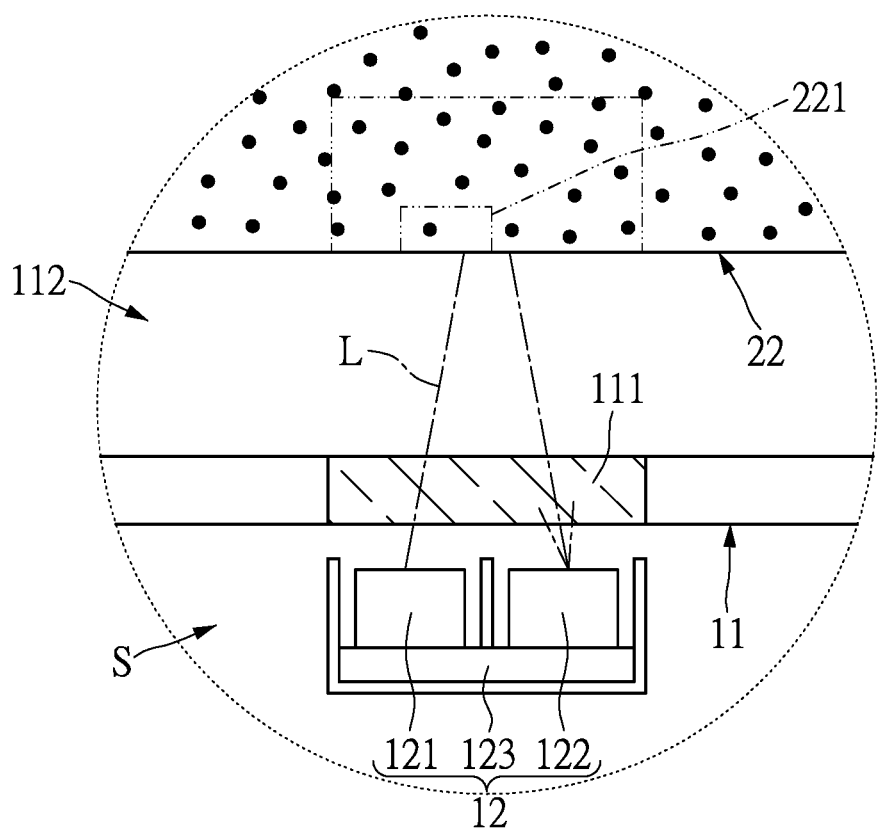
FIG. 3A is an enlarged view showing FIG. 2A after the manipulation member is moved.
Figure 3B:
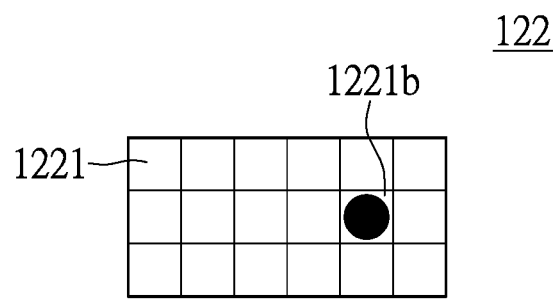
FIG. 3B is a top view showing the sensor array of FIG. 3A.
Figure 4A:
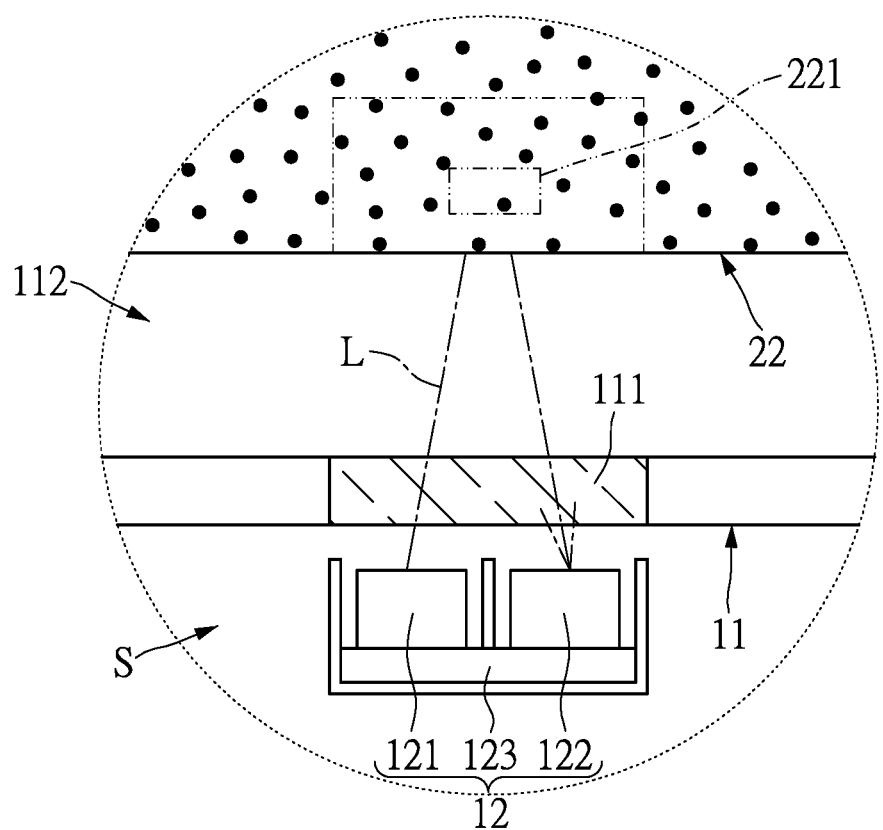
FIG. 4A is an enlarged view showing FIG. 2A after the manipulation member is rotated.
Figure 4B:
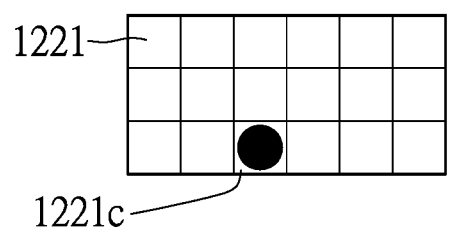
FIG. 4B is a top view showing the sensor array of FIG. 4A.

For example, the symbol portion 221 arranged at the initial position shown in FIG. 2B reflects light L to the receiver 1221a shown in FIG. 2C; the symbol portion 221 arranged at the adjusting position shown in FIG. 3A reflects light L to the receiver 1221b shown in FIG. 3B; the symbol portion 221 arranged at the adjusting position shown in FIG.

4A reflects light L to the receiver 1221*c* shown in FIG. 4B. The receiver 1221*a* of FIG. 2C and the receiver 1221*b* of FIG. 3B are compared by using the calculating unit 123 to calculate that the symbol portion 221 has moved in a left direction for a specific distance. Or, the receiver 1221*a* of FIG. 2C and the receiver 1221*c* of FIG. 4B are compared by using the calculating unit 123 to calculate that the symbol portion 221 has rotated upward at a specific angle.

Roughness of an outer surface of any object in a microcosmic state is not entirely the same, so the roughness of the outer surface of the manipulation member 2 in the instant embodiment is also not the same. Thus, the portion of the manipulation member 2, which does not have any pattern, corresponding in position to light L emitted from the lighting unit 121 (i.e., the portion of the manipulation member 2 surrounded by the outer dot-chain line shown in FIG. 2B) reflects light L to travel in different paths because of the roughness difference between the symbol portion 221 and a neighboring portion around the symbol portion 221, such that the symbol portion 221 can be used as a conventional grating, but the instant disclosure is not limited thereto. In a non-shown embodiment, the outer surface of the manipulation member 2 is formed with a plurality of different patterns (e.g., grating) for providing the calculating unit 123 to estimate a moving trace of the manipulation member 2.

Specifically, the manipulation member 2 in the instant embodiment has a cylindrical controlling segment 21 and a cylindrical active segment 22 integrally connected to the controlling segment 21. An outer diameter of the controlling segment 21 is greater than that of the active segment 22, and a length of the controlling segment 21 is greater than that of the active segment 22.

The elastic component 3 (e.g., rubber pad) is disposed on a bottom of the accommodating trough 112. The two gaskets 4*a*, 4*b* are sleeved at the active segment 22, and the active segment 22 is inserted into the accommodating trough 112 to abut against the elastic component 3, thereby the elastic component 3 provides an elastic force to the manipulation member 2. The controlling segment 21 is at least partially arranged out of the accommodating trough 112. Two opposite surfaces of the gasket 4*a* respectively abut against the controlling segment 21 and the case 11 (the controlling segment 21 and the case 11 hold the gasket 4*a* in place), and the controlling segment 21 and the gasket 4*a* are configured to generate a friction force there-between when the controlling segment 21 is rotated with respect to the case 11. Moreover, each one of the gaskets 4*a*, 4*b* abuts against the case 11 and the active segment 22 for sealing the accommodating trough 112.

In addition, the instant disclosure is not limited to the two gaskets 4*a*, 4*b* of the instant embodiment. For example, the two gaskets 4*a*, 4*b* can be integrally formed in one piece. Moreover, the instant disclosure is not limited to the manipulation member 2 shown in FIG. 2A. For example, the manipulation member 2 can be a rod, a disc, or a guideway, and so on.

The assembly 1 in the instant embodiment takes the optical detection module 12 arranged in the waterproof space S of the case 11 for example, but the assembly 1 in a non-shown embodiment can have other electronic components arranged in the waterproof space S. Or, the waterproof space S defined by the case 11 can be provided for only receiving the optical detection module 12, so that the case 11, the optical detection module 12, and the manipulation member 2 are formed as an optical encoder having waterproof function, and the optical encoder can be applied to or installed on any suitable electronic device (not shown).

Second Embodiment

Figure 5:
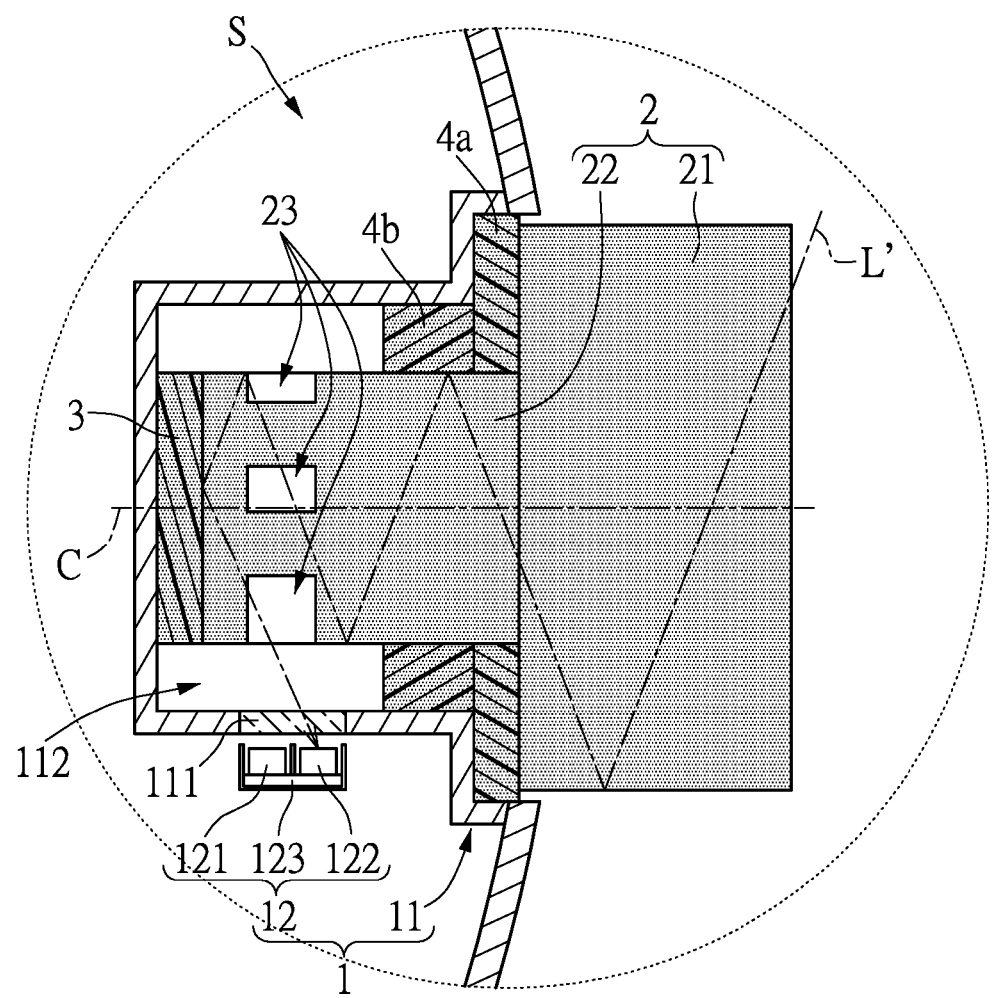
FIG. 5 is a cross-sectional view showing the electronic device in another embodiment.
Figure 6:
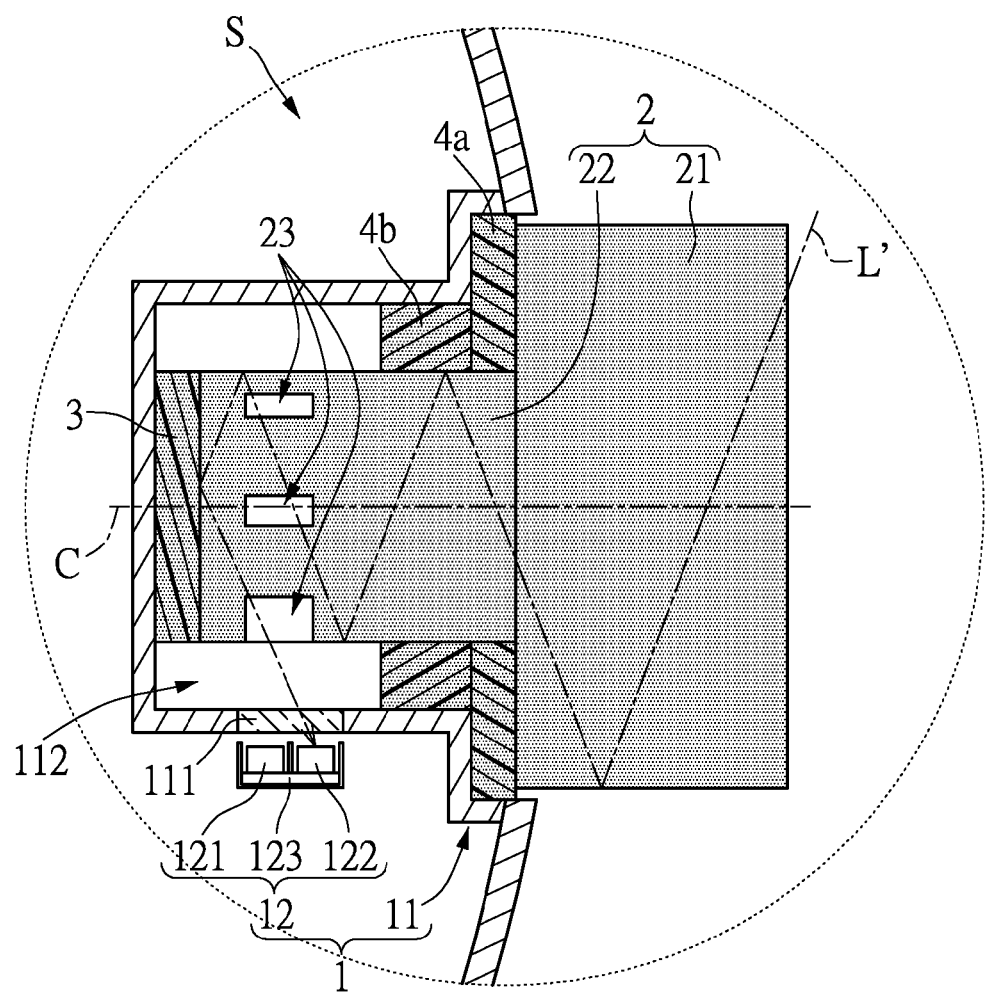
FIG. 6 is a cross-sectional view showing FIG. 5 after the manipulation member is rotated.

Please refer to FIGS. 5 and 6, which show a second embodiment of the instant disclosure. The electronic device 100 (or the wearable device 100) of the second embodiment is similar to that of the first embodiment, so the same features of the two embodiments are not disclosed again. The different features of the two embodiments are disclosed as follows.

The manipulation member 2 has a light guiding path (not labeled), and the manipulation member 2 is configured to receive an external light L' from outside of the wearable device 100, wherein the external light L' is guided toward the sensor array 122 by traveling in the light guiding path and then passing through the translucent region 111.

Figure 7:
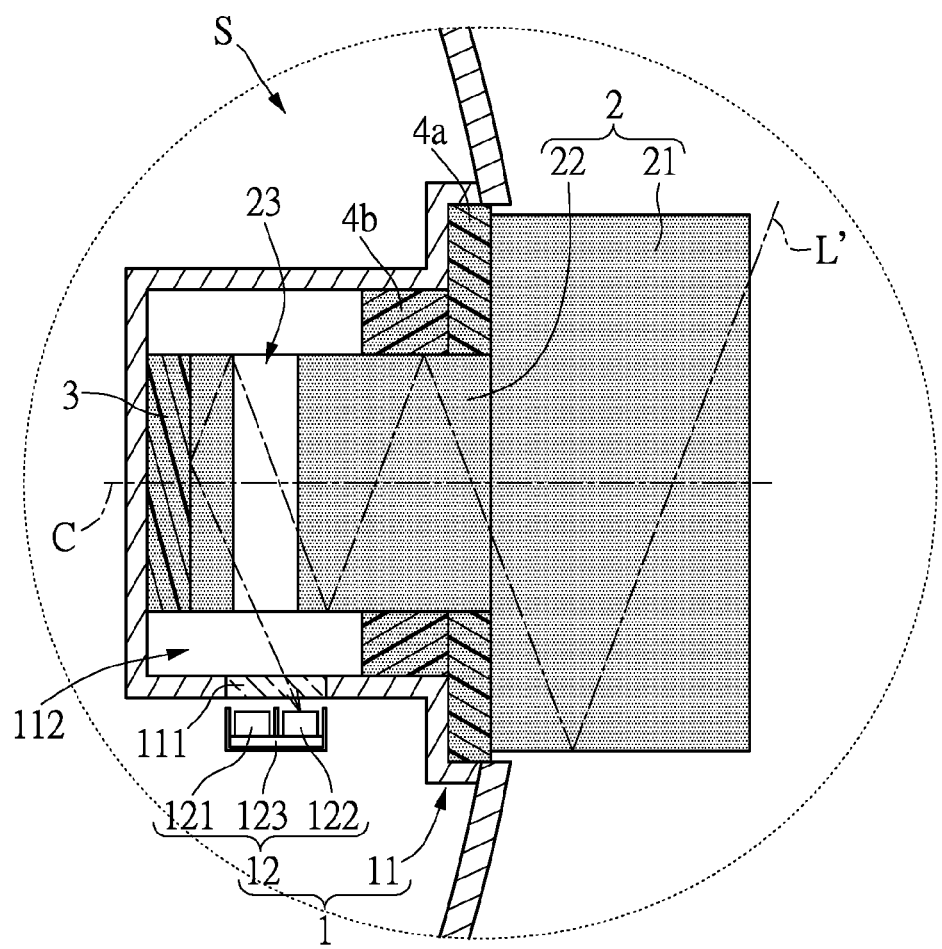
FIG. 7 is a cross-sectional view showing a variety of FIG. 5.

For example, the manipulation member 2 is made of a light guiding material, and a light reflecting material is coated on an outer surface of the manipulation member 2, so the manipulation member 2 can be used to guide light and provides the light guiding path therein. A plurality of portions of the outer surface of the manipulation member 2 have different sizes and are not coated with the light reflecting material, and the portions of the outer surface of the manipulation member 2 are defined as a plurality of light outlets 23 of the light guiding path. However, the construction of the manipulation member 2 is not limited to the instant embodiment. As shown in FIG. 7, the manipulation member 2 can be provided with a circular light outlet 23 formed around the manipulation member 2, and a circular center of the light outlet 23 is preferably arranged at the central axis C.

Accordingly, the manipulation member 2 is configured to guide the external light L' toward the sensor array 122 to leave out, by the light guiding path via at least one of the light outlets 23, and then passing through the translucent region 111. For example, the manipulation member 2 is configured to guide the external light L' toward the sensor array 122 by leaving out the light guiding path via two of the light outlets 23 and then passing through the translucent region 111 when the manipulation member 2 is arranged at the initial position (as shown in FIG. 5) and the adjusting position (as shown in FIG. 6). Specifically, after the external light L' passes through the at least one light outlet 23 and the translucent region 111, the external light L' arrives on the sensor array 122 to form a light spot. If the light spot is smaller than or identical to a sensing area of the sensor array 122, the moving trace of the manipulation member 2 can be recognized by the size and movement of the light spot. If the light spot is greater than the sensing area of the sensor array 122, the moving trace of the manipulation member 2 can be recognized by a time period that the light spot has stopped over the sensor array 122 when the manipulation member 2 is rotated.

Moreover, the lighting unit 121 of the wearable device 100 in the instant embodiment can be closed, and the sensor array 122 can be used to receive the external light L' for judging a brightness level of the surroundings. In other words, if the sensor array 122 still receives enough external light L' when the lighting unit 121 is closed, the surroundings are bright.

In addition, the wearable device 100 in the above description needs to close the lighting unit 121 when the wearable device 100 is used to detect a brightness level of surroundings, but the instant disclosure is not limited thereto. For example, the wearable device 100 can further include a plurality of different light filtering materials (not shown) respectively arranged on the receivers 1221 of the sensor array 122, thereby the lighting unit 121 can remain operating when the wearable device 100 is used to detect a brightness level of surroundings.

THE POSSIBLE EFFECT OF THE INSTANT DISCLOSURE

In summary, the electronic device of the instant disclosure is provided with a waterproof function by adapting the optical detection module in the waterproof space and arranging the manipulation member outside the waterproofing space, and the electronic device has a better resolution by using the optical detection module.

Moreover, the electronic device does not comprise any light guiding member arranged between the optical detection module and the manipulation member, the portion of the manipulation member corresponding in position to light emitted from the lighting unit reflects light to travel in different paths because of the roughness difference, and the portion of the manipulation member does not have any pattern formed on it, thus the cost of the electronic device can be effectively reduced.

In addition, the elastic component and the gasket are arranged in the accommodating trough of the case to cooperate with the manipulation member, thereby providing a better operation feeling to the user.

Furthermore, the manipulation member has a light guiding path to guide external light onto the sensor array, thereby the sensor array can be used to receive the external light for judging a brightness level of the surroundings.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. An electronic device with a waterproof structure, comprising:
    an assembly, comprising:
        a case having a translucent region, wherein an enclosed waterproof space is defined by the case; and
        an optical detection module arranged in the waterproof space, wherein the optical detection module has a lighting unit and a sensor array arranged close to the lighting unit, the translucent region is located in a lighting path of the lighting unit, and the lighting unit is configured to emit light to penetrate out of the waterproof space via the translucent region; and
    a manipulation member movably disposed on an outer surface of the case and arranged outside the waterproof space, wherein at least part of the manipulation member is corresponding in position to the translucent region and has a symbol portion, and the manipulation member is movable with respect to the translucent region between an initial position and an adjusting position;
    wherein the lighting unit is configured to selectively emit light to arrive on the manipulation member by passing through the translucent region, and the manipulation member is configured to reflect the light emitted from the lighting unit to arrive on the sensor array by passing through the translucent region; at least two different receivers of the sensor array are configured to receive light reflected from the symbol portion of the manipulation member when the manipulation member is arranged at the initial position and the adjusting position.

2. The electronic device as claimed in claim 1, wherein the electronic device does not comprise any light guiding member arranged between the optical detection module and the manipulation member, and the lighting unit is configured to emit light to directly pass through the translucent region.

3. The electronic device as claimed in claim 1, wherein a portion of the manipulation member corresponding in position to light emitted from the lighting unit reflects light to travel in different paths because of a roughness difference thereof, and the portion of the manipulation member does not have any pattern formed on it.

4. The electronic device as claimed in claim 1, wherein the manipulation member is substantially symmetrical to a central axis, and the manipulation member is configured to move into the central axis and/or to rotate around the central axis when the manipulation member is adjusted between the initial position and the adjusting position.

5. The electronic device as claimed in claim 1, wherein an accommodating trough is recessed on the outer surface of the case, the translucent region is arranged on the accommodating trough; the electronic device further comprises an elastic component arranged on a bottom of the accommodating trough, the manipulation member is inserted into the accommodating trough to abut against the elastic component.

6. The electronic device as claimed in claim 5, wherein the manipulation member has a controlling segment and an active segment connected to the controlling segment, an outer diameter of the controlling segment is greater than that of the active segment, the active segment is inserted into the accommodating trough to abut against the elastic component, the controlling segment is at least partially arranged out of the accommodating trough; the electronic device further comprises a gasket sleeved at the active segment, two opposite surfaces of the gasket respectively abut against the controlling segment and the case, and the controlling segment and the gasket are configured to generate a friction force there-between when the controlling segment is rotated with respect to the case.

7. The electronic device as claimed in claim 6, wherein the gasket abuts against the case and the active segment for sealing the accommodating trough.

8. The electronic device as claimed in claim 1, wherein the manipulation member has a light guiding path, the manipulation member is configured to receive an external light from outside of the electronic device, wherein the external light is guided toward the sensor array by traveling in the light guiding path and then passing through the translucent region.

9. The electronic device as claimed in claim 8, wherein the light guiding path has at least one light outlet, the manipulation member is configured to guide the external light toward the sensor array to leave out by the light guiding path via the at least one light outlet and then passing through the translucent region when the manipulation member is arranged at the initial position or the adjusting position.

10. The electronic device as claimed in claim 9, wherein after the external light passes through the at least one light outlet and the translucent region, the external light arrives on the sensor array to form a light spot, and the light spot is smaller than or identical to a sensing area of the sensor array.

11. The electronic device as claimed in claim 9, wherein after the external light passes through the at least one light outlet and the translucent region, the external light arrives on the sensor array to form a light spot, and the light spot is greater than a sensing area of the sensor array.

12. The electronic device as claimed in claim 1, wherein the optical detection module is a package structure and has a calculating unit electrically connected to the sensor array, the calculating unit is configured to estimate a moving trace of the manipulation member according to an information of the sensor array corresponding to the received light.

13. An electronic device with a waterproof structure, comprising:
   an assembly, comprising:
      a case having a translucent region, wherein a waterproof space is defined by the case; and
      an optical detection module arranged in the waterproof space, wherein the optical detection module has a lighting unit and a sensor array, the lighting unit is configured to emit light to penetrate out of the waterproof space via the translucent region; and
   a manipulation member movably disposed on an outer surface of the case, wherein at least part of the manipulation member is corresponding in position to the translucent region, the lighting unit is configured to selectively emit light to arrive on the manipulation member by passing through the translucent region, and the manipulation member is configured to reflect the light emitted from the lighting unit to arrive on the sensor array by passing through the translucent region.

14. The electronic device as claimed in claim 13, wherein the electronic device does not comprise any light guiding member arranged between the optical detection module and the manipulation member, and the lighting unit is configured to emit light to directly pass through the translucent region.

15. The electronic device as claimed in claim 13, wherein an accommodating trough is recessed on the outer surface of the case, the translucent region is arranged on the accommodating trough; the electronic device further comprises an elastic component arranged on a bottom of the accommodating trough, the manipulation member is inserted into the accommodating trough to abut against the elastic component.

16. The electronic device as claimed in claim 15, wherein the manipulation member has a controlling segment and an active segment connected to the controlling segment, an outer diameter of the controlling segment is greater than that of the active segment, the active segment is inserted into the accommodating trough to abut against the elastic component, the controlling segment is at least partially arranged out of the accommodating trough; the electronic device further comprises a gasket sleeved at the active segment, two opposite surfaces of the gasket respectively abut against the controlling segment and the case, and the controlling segment and the gasket are configured to generate a friction force there-between when the controlling segment is rotated with respect to the case; the gasket abuts against the case and the active segment for sealing the accommodating trough.

17. The electronic device as claimed in claim 13, wherein the manipulation member has a light guiding path, the manipulation member is configured to receive an external light from outside of the electronic device, wherein the external light is guided toward the sensor array by traveling in the light guiding path and then passing through the translucent region.

18. The electronic device as claimed in claim 17, wherein the light guiding path has at least one light outlet, the manipulation member is configured to guide the external light toward the sensor array to leave out by the light guiding path via the at least one light outlet and then passing through the translucent region.

19. The electronic device as claimed in claim 13, wherein the optical detection module is a package structure and has a calculating unit electrically connected to the sensor array, the calculating unit is configured to estimate a moving trace of the manipulation member according to an information of the sensor array corresponding to the received light.

20. An electronic device with a waterproof structure, comprising:
   an assembly, comprising:
      a case having a translucent region, wherein a waterproof space is defined by the case; and
      an optical detection module arranged in the waterproof space, wherein the optical detection module has a lighting unit and a sensor array, the lighting unit is configured to emit light to penetrate out of the waterproof space via the translucent region; and
   a manipulation member movably disposed on an outer surface of the case, wherein at least part of the manipulation member is corresponding in position to the translucent region, the lighting unit is configured to selectively emit light to arrive on the manipulation member by passing through the translucent region, and the manipulation member is configured to reflect light emitted from the lighting unit to arrive on the sensor array by passing through the translucent region:
   wherein a portion of the manipulation member corresponding in position to light emitted from the lighting unit reflects light to travel in different paths because of a roughness difference thereof, and the portion of the manipulation member does not have any pattern formed on it.

* * * * *